Feb. 17, 1942.   G. D. GULER   2,273,260
HEATING AND CONTROL SYSTEM
Filed June 29, 1938   3 Sheets-Sheet 1

Fig.1

INVENTOR
George D. Guler
BY
*George H. Fisher*
ATTORNEY

Feb. 17, 1942. G. D. GULER 2,273,260
HEATING AND CONTROL SYSTEM
Filed June 29, 1938 3 Sheets-Sheet 3

INVENTOR
George D. Guler
BY
*George H. Fisher*
ATTORNEY

Patented Feb. 17, 1942

2,273,260

UNITED STATES PATENT OFFICE 2,273,260

HEATING AND CONTROL SYSTEM

George D. Guler, Philadelphia, Pa., assignor to Minneapolis-Honeywell Regulator Company, Minneapolis, Minn., a corporation of Delaware Application June 29, 1938, Serial No. 216,509

9 Claims. (Cl. 236—46)

My invention as herein disclosed relates to heating systems and improved control system arrangements therefor. My invention is more particularly directed to and adapted for utilization of its principles in the heating and control of heating in buildings wherein it is desired to maintain different day and night temperatures and wherein it may be necessary to shift certain sections or individual rooms of the building from night to day temperatures at irregular times as desired by occupants making use of the building.

In the preferred form of my invention I employ a heating system utilizing both direct and indirect radiation and which may take the form of a zoned system for purposes of proper control of heating. With this system I use an improved electrical control arrangement providing for dual control from either a remote or immediate point, having as the object of my invention the accomplishment of this type of control electrically whereby the results demanded of such a system may be gained in a more reliable, inexpensive, and desirable manner.

Another objective of my invention is the provision of a unique combination of a unit ventilator, an indirect radiator, and a direct radiator for maintaining predetermined desired day and night temperatures, for providing the proper influx of fresh air and for automatically and efficiently bringing about the shift from day to night temperatures and back again. In conjunction with these objectives, a further object of my invention is the introduction to the art of a new dual control cycle having certain new functions representing improvements over similar known systems such as pneumatic systems. More particularly the object of the invention in this respect is the provision of a dual electrical control system providing for control from a remote point or manually from an immediate point and capable of automatically recycling after being manually reset.

Another object of my invention is the provision in a day-night temperature control system employing unit ventilators of an interlocking electrical control arrangement whereby the system automatically begins a daytime control cycle as a result of the single operation comprising the automatic starting of the unit ventilator fans in the morning.

Often in a building, for example a schoolhouse, it may be necessary to return certain rooms to daytime temperatures after the control devices have been automatically reset to a night setting. An important object of my invention is the provision of a control arrangement for returning a whole section or zone of a building to a daytime setting by operation of a single switch which may be located in the boiler room and accessible to the janitor. This eliminates the need of the janitor or other person going from room to room in a designated group of rooms and returning the settings of individual control instruments or devices to the daytime setting.

For accomplishing my particular cycle of dual control as referred to above, I have devised a novel mechanical latch electric relay device. This relay device is incorporated in the organization comprising the rest of the system in a manner such that when it is pulled in the system operates on the day cycle and when it is out, on the night cycle. The relay is of such a nature that it may be manually pulled and latched in for manually inaugurating a day cycle of operation in an individual room or rooms. If the mechanical latch is not manually released and the particular room or rooms are left on the day temperature setting, the mechanical latch will automatically release when the relay is again electrically energized. This relay is an important feature of my invention and distinct objects of my invention reside in the accomplishment of the results produced by the relay, its mechanical structure, and its combination with various other elements of my improved system.

Referring to the drawings.

Figure 1:
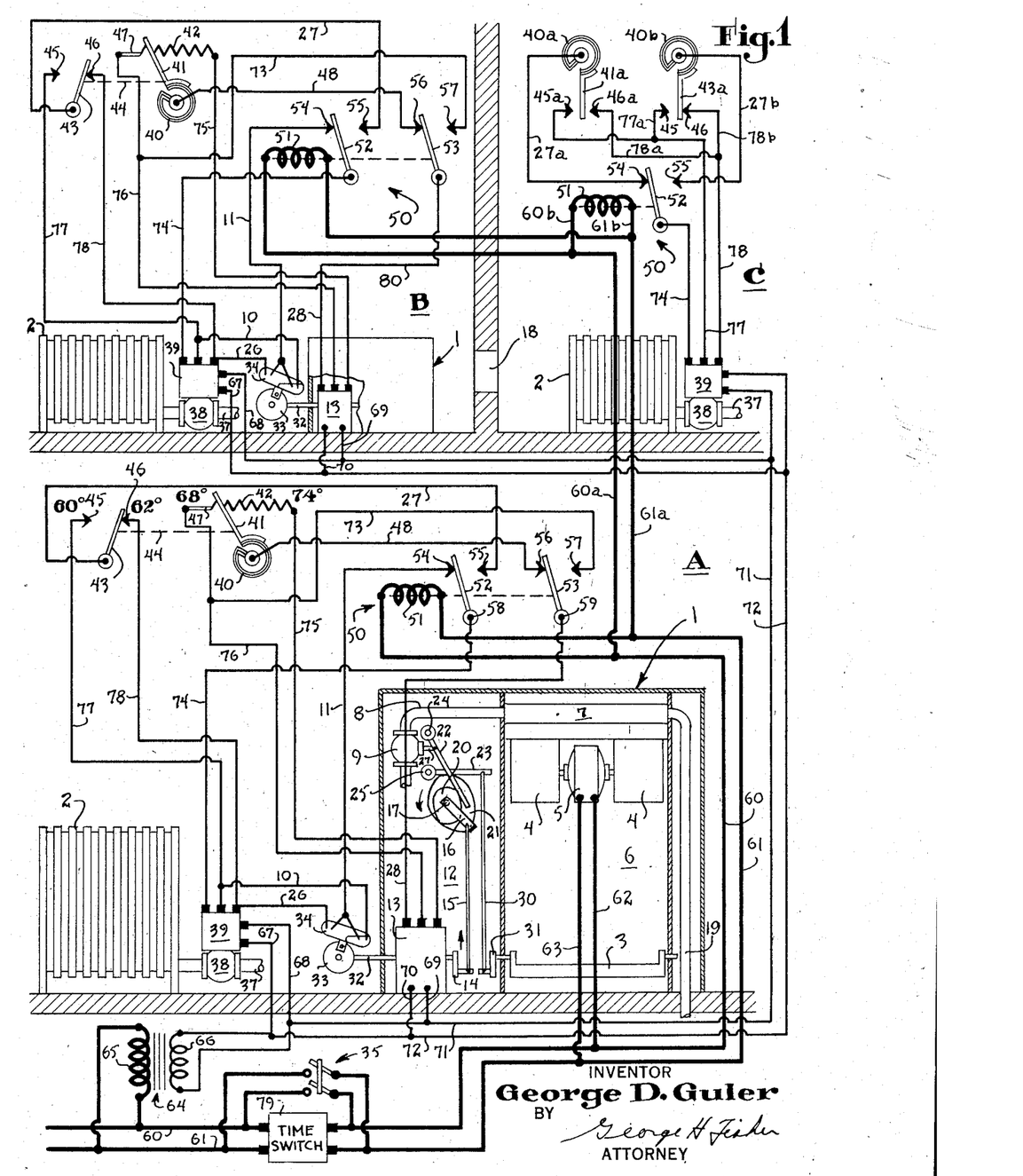
Figure 1 represents a part of my complete system for one zone of a zoned building, the particular zone shown having three rooms.

Referring to Figure 1 of the drawings, I have shown a portion of a building comprising three rooms designated A, B and C, each room containing its respective heating apparatus and controls therefor. The three rooms A, B and C may form one zone of a zone control system or these three rooms may be grouped for purposes of control from a master control source for reasons which will become clear as the specification proceeds. For purposes of simplifying my specification and in order that it may proceed in a clear and orderly manner, I will first describe the structure of room A and its operation.

*Figure 1—Apparatus of room A*

The heating apparatus employed in room A comprises principally a unit ventilator designated generally at 1, and a direct radiator indicated at 2. The unit ventilator 1 comprises apparatus including a fresh air and recirculated air proportioning damper 3 and air circulating fans 4 which are driven by an electric motor indicated at 5. Numeral 7 indicates a heating coil adapted for the circulation of steam or the like therethrough, which is located in the path of the air circulated through the ventilator into the space being heated. The apparatus so far mentioned is housed within a portion 6 of the unit ventilator, the details of construction of which and the arrangement of parts of which are well known in the art, and I do not intend to propose any claims specifically to this portion of my disclosure. The heating coil 7 has an inlet conduit 8 and an outlet conduit 19 both of which may be connected to any suitable source of heating medium supply. Connected in the inlet conduit 8 is a control valve 9 which is controlled in a manner which I will presently describe. The unit ventilator 1 also has a portion 12 which houses a proportioning motor 13, which motor controls the damper 3 and also the control valve 9. The motor 13 may be of the type employed in a remote control system disclosed in the patent of D. G. Taylor, No. 2,028,110, which I will refer to more particularly later. The motor 13 has a crank indicated at 14 operated thereby which is connected by link 15 to a rocker arm 16 which is operable to rotate the shaft indicated at 17. Mounted on the shaft 17 are cams 20 and 21, the cams having cam followers 22 and 23 respectively associated therewith. The cam followers 22 and 23 take the form of lever actuating arms pivoted at points 24 and 25 respectively. The lever actuating arm 22 is pivoted to the stem 27 of the control valve 9 in a manner such that the valve may be regulated by movement of arm 22 in response to rotation of the cam 20. The lever arm 23 is connected by a link 30 to a crank 31, the crank 31 forming the immediate operating means for the damper 3 which has previously been described. The contour of the cams 20 and 21 is generally that as shown on the drawings, and I will more particularly point out how the valve 9 and damper 3 are controlled in response to rotation of the cams in the description of operation which follows.

It will be seen that the shaft 32 of the proportioning motor 13 extends through a side wall of the housing of the unit ventilator 1 and on the end of this shaft is a disc 33 to which is attached a double-ended mercury switch 34 which may be tilted by rotation of the disc 33 in one direction or the other. I will refer to the mercury switch 34 more particularly when I describe the manner of control I employ in my system.

The direct radiator 2 has a supply conduit 37 for heating medium connected thereto, and interposed in the supply conduit is a control valve 38. The supply of heating medium for radiator 2 may be from the same source as that which supplies heating coil 7 previously described. Valve 38 is controlled by a motor 39 which may be of the type disclosed and described in detail in the application of Carl G. Kronmiller, Serial No. 15,965, issued as Patent No. 2,146,681, on Feb. 7, 1939. This particular valve is controlled in the same manner as that of the said application and I will refer to this control more particularly hereinafter.

In room A I employ control instruments including an electric proportioning thermostat indicated at 40. The thermostat 40 may be of the conventional bimetallic element type as shown, having a movable arm 41 forming the slider for a slide wire resistance 42. The slider 41 moves to the left upon a fall in temperature and to the right along the slide wire resistance upon a rise in temperature. The thermostat 40 is of the dual type and I have shown a switch blade 43 which is mechanically connected to the slider 41 of thermostat 40 by means indicated diagrammatically by the broken line 44. The thermostat 40 is arranged so that it operates over a specified range of temperatures, being operable to move the slider 41 from one end of the slide wire resistance 42 to the other between temperature variations of from 68° to 74° for example, as indicated on the drawings. The structural relationship between the switch blade 43 and the slider 41 is such that the switch blade 43 is not operated until the temperature to which thermostat 40 is responsive has fallen a predetermined number of degrees below the above mentioned temperature range. Switch blade 43 is arranged to cooperate with fixed electrical contacts 45 and 46 and may engage these contacts at temperatures of 60° and 62° respectively for example, as indicated on the drawings. It will be noted that the slider 41 may slide off the left end of resistance 42 as shown at 47 when the switch blade 43 is being operated between its associated contacts. It will be seen that the ends of slide wire resistance 42 are connected to the proportioning motor 13 by wires 75 and 76. The electrical contacts 45 and 46 are connected to the motor 39 by wires 77 and 78. The electrical wiring and particular circuits I employ in the control of the motors 13 and 39 will be more fully explained in the description of operation which follows. From the above it will be understood that that part of my dual thermostat comprising the switch blade 43 is for night operation and that slider 41 and resistance 42 are utilized for control during day operation.

Numeral 50 designates generally an electric relay device which forms an important part of my invention and the structure of which I have shown in detail in Figures 3 to 6 inclusive, and which will be described in detail hereinafter. The relay 50 comprises a winding 51 which cooperates with a solenoid or armature in the well-known manner of electrical relays to operate a pair of switch arms 52 and 53 which are connected to the solenoid or armature. The switch arm 52 may engage either of a pair of electrical contacts 54 and 55 and the switch arm 53 may engage either of a pair of electrical contacts 56 and 57.

Referring now to the electrical wiring of my system as employed in the apparatus of room A, numerals 60 and 61 indicate a pair of line conductors which extend into the basement of the building and are connected to a suitable source of electric power. It will be seen that the fan motor 5 is connected to the line conductors 60 and 61 by conductors 62 and 63 respectively, and that the ends of the coil 51 are connected to the line conductors 60 and 61. Numeral 64 represents a step-down transformer which may be of conventional type having a primary winding 65 and a secondary winding 66, and which supplies power at a suitable voltage for the various control instruments and devices which I employ in my system. Power for the motor 39 is supplied thereto through wires 67 and 68 which are connected to the secondary of the transformer, and power is supplied to the proportioning motor 13 through wires 69 and 70 which are connected to wires 71 and 72 as shown, the wires 71 and 72 leading to other rooms of the building. Numeral 79 indicates a time switch interposed in the power circuit formed by the line conductors 60 and 61 and which may take the form of any suitable time switch at present known to the art. I adjust and arrange the time switch 79 so that it closes the electrical circuit therethrough at a predetermined time in the morning and breaks the circuit at a predetermined time in the evening. I also use a manual switch 35 connected in shunt relation as shown with time switch 79 so that I may energize the circuit formed by conductors 60 and 61 at any time when it is not energized through the time switch.

Before proceeding with the description of operation of the apparatus of room A and certain electrical control circuits to which I have not yet referred, I will describe in detail the construction of the relay 50 in order that the manner of its structural and functional cooperation in the control of the system may be better understood.

Mechanical latch relay

Figures 3 to 6 inclusive are detail structural views illustrating the preferred form of my improved mechanical latch relay 50. The device comprises a coil winding 51 mounted on a block of suitable material 81 which may be Bakelite or other similar composition. Within the coil winding 51 is an iron core 82 which cooperates with an armature 83 so as to draw the armature to the right when the coil winding is energized. The armature 83 is of the spring hinge type, being pivoted or hinged at 84 and being biased in a counter-clockwise direction by a coil spring 85. Attached to the armature 83 in any suitable manner is a block of Bakelite or other suitable insulating material 86 which spaces the armature from switch contact arms 52 and 53. The switch contact arm 53 is behind the switch contact arm 52 and is therefore not visible on Figures 3 and 5. The switch contact arm 52 has contacts as shown which cooperate with the fixed contacts 54 and 55 and the switch contact arm 53 has contacts which cooperate with the fixed contacts 56 and 57. These switch contact arms and contacts are the ones that have already been described in connection with Figure 1 and are numbered the same. The switch contact arms 52 and 53 are floatingly supported by the armature 83, the contact arms being carried by pins 87 and 88 having washers threaded thereon and cotter pins inserted through their ends as shown and having small coil springs 89 and 90 interposed between the washers and the contact arms. Secured to the armature 83 at a point below the pivot point 84 is a horizontally extending lever member 91.

Figures 3, 4:
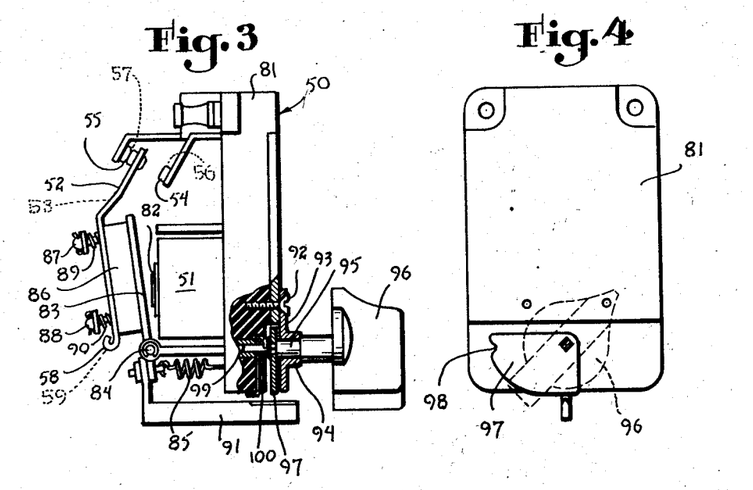
Figure 3 is a side view partly broken away of my improved mechanical latch relay.
Figure 4 is another view of the structure of Figure 3.
Figures 5, 6:
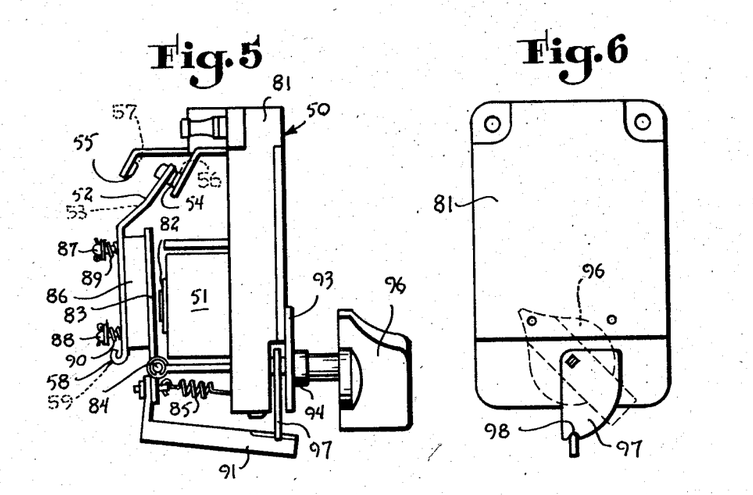
Figure 5 is similar to Figure 3 but showing the relay in its energized rather than its deenergized position.
Figure 6 is similar to Figure 4 but showing the manual operating knob of the relay in a different position.

Fastened to the back portion of the relay device by a screw 92 is a metal member 93 having a boss 94 forming a bearing in which is journalled a shaft 95 rotatable by means of a manual operating knob 96. The shaft 95 carries a cam 97 having a detent 98, the contour of the cam and detent being best shown in Figures 4 and 5. The left end of the shaft of the manual operating knob 96 is of smaller diameter and is journalled in a bearing 99 mounted within the Bakelite material 81 as shown. Numeral 100 represents a small coil torsion spring, one end of which is fastened to the cam 97 and the other end of which is fastened to the Bakelite material 81, and which continuously torsionally biases the manual operating knob 96 toward the position in which it is shown in Figure 4. By rotating the manual operating knob 96 from the position shown in Figure 4 to its position as shown in Figure 6, the cam 97 may be made to force the end of the lever member 91 downwardly until the end of this member is latched in the detent 98 previously described. When so latched, the manual operating knob remains in the position shown in Figure 6 against the torsional force of spring 100. When the end of lever member 91 is forced downwardly by cam 97 as seen in Figures 5 and 6, the armature 83 is rotated in a clockwise direction so that it assumes a position which is substantially the same as that which it assumes when winding 51 is electrically energized. It will be understood of course that in the position of the parts as seen in Figure 3, the coil of the relay is deenergized and in Figure 5 the parts are shown substantially in the position which they assume when the coil 51 is energized. As should be understood from the previous description of my improved relay in connection with the apparatus of room A, switch arm 52 may complete an electrical circuit through either of contacts 54 or 55 and the switch arm 53 may complete an electrical circuit through either of the switch circuits 56 or 57. As seen on Figures 3 and 5, electrical connections to the switch arms 52 and 53 are made at points indicated at 58 and 59.

Referring now to Figure 5, as above described, the relay is shown manually latched in the "in" position. It is apparent that the manual latch may be now manually released, permitting coil spring 85 to move the armature 83 in counter-clockwise direction to "out" position of the relay. Automatic release of the manual latching mechanism will be effected upon energization of the coil 51. It will be seen that in Figure 5 there is a slight space between the armature 83 and the core 82, and that the contacts of switch arms 52 and 53 are engaging the fixed contacts 54 and 56 respectively. Now should the coil 51 be electrically energized armature 83 will be drawn further in a clockwise direction causing coil springs 89 and 90 to be slightly compressed and the clockwise movement at the right end of lever member 91 will cause that member to become disengaged from the detent 98. Upon disengagement, cam 97 will obviously be released and the torsion spring 100 will immediately return the manual operating knob 96 to its position as seen in Figure 4.

I will next describe the operation of the apparatus of room A in conjunction with the particular manner of combination of my improved mechanical latch relay with the other elements of the equipment of room A.

Operation of apparatus of room A

With the parts in the position shown on the drawings, the temperature is at substantially 68° as indicated by the position of the slider 41. Let it be assumed at this time for purposes of explanation of the cycle, that a daytime cycle has been initiated a short time previously and the apparatus is in the process of bringing the temperature from a night-time value up to a desired daytime value. At this time the coil valve 9 is open, the fresh air damper 3 is in minimum fresh air position, fans 4 are running and the valve 38 is open, and thus the system is operating at a maximum capacity to bring the temperature up to the daytime value while simultaneously supplying the minimum amount of fresh air necessary for proper ventilation. While the direct radiator 2 is at this time not under the control of the switch blade 43, it is kept open by operation of the mercury switch 34. It will be understood that the motor 39 for coil valve 38 is operated in the same manner as set forth in the Kronmiller Patent No. 2,146,681 previously referred to. More specifically, when electrical connections are completed between wire 78 and a wire 74, the valve 38 is closed and when electrical connections are completed between wire 77 and the wire 74, the coil valve 38 is open. With the parts in the position shown in Figure 1, it will be seen that connections are completed between the wire 77 and the wire 74 through a circuit which is as follows: from wire 77 to a wire 10 to the right end of the mercury switch 34, from the mercury switch 34 through a wire 11 and to the switch blade 52 to the wire 74. In the position of the parts shown, the damper motor 13 acting through the cam 21 and actuating arm 23 has just opened the damper 3 to its minimum fresh air position necessary for purposes of ventilation. It will be understood that thermostat 40, through the circuits formed by wires 75, 76, and the connection from the thermostat through wire 48, switch 53 and wire 28, controls damper motor 13 in the same manner as the motor of the Taylor patent previously referred to is controlled. Movement of slider 41 to the right operates motor 13 in heat decreasing direction and movement of slider 41 to the left operates motor 13 in heat increasing direction. As the temperature continues to rise due to both the valve 9 and valve 38 being open, at a temperature of, for example 69°, the damper motor 13 will have moved to such a position as to tilt the mercury switch 34 so as to break the contacts at the right end of the switch and make those at the left end. Connection of the electrodes at the left end of mercury switch 34 causes closure of the valve 38 by means of a circuit to the motor 39 which is as follows: from the wire 78 to the wire 26 to the left end of mercury switch 34 to wire 11, to switch blade 52, and from switch blade 52 through wire 74 and back to the motor 39. At substantially this temperature of 69°, at which mercury switch 34 causes closure of valve 38, damper motor 13 acting through cam 20 begins moving the valve 9 in closing direction, the damper 3 remaining at this time in a position admitting a minimum quantity of fresh air necessary for ventilation. It will be seen that cam 20 rotating in a counter-clockwise direction causes the stem 27 of valve 9 to be pushed outwardly, which action moves the valve towards closed position. As the temperature continues its rise to a temperature of substantially 70°, the valve 9 will be fully closed and at this temperature the damper motor acting through cam 21 will begin to move damper 3 towards its maximum open position admitting 100% fresh air for circulation through the room. Should the temperature rise to a relatively high value of, for example 72°, the fresh air damper will be open to its maximum fresh air position, coil valve 9 remaining closed during this movement. While the above describes a sequence of operation from one extreme of temperature to another, it will be understood that an equilibrium temperature will be reached at some desired value, for example 71°, at which the slider 41 will be substantially at the mid point of resistance 42. At this point the coil valve 9 and the damper 3 will be positioned relatively so that the desired temperature will be maintained and the proper volume of fresh air will be circulated for purposes of ventilation and for cooperating in maintaining the desired temperature. It will also be understood that should the temperature at any time during the day for any reason fall to 69° as above described, the coil valve 38 will be opened by reason of operation of the switch 34 and the direct radiator 2 will at once be turned on so as to supply heat for quickly bringing the temperature back up to the predetermined desired value.

My improved system provides for automatically reducing the room temperature to a lower value to be maintained at night whereby savings in fuel cost may be effected inasmuch as many buildings such as school houses are not occupied at night. At a predetermined time in the evening, for example one hour after school is out or the like, time switch 79 will break the circuit formed through the line conductors 60 and 61. It will thus be seen that by reason of this discontinuance of the power supply the fan motor 5 will stop and the relay coil 51 will be deenergized. The switch arms 52 and 53 will immediately be moved to the right, making contact with the fixed contacts 55 and 57 respectively. As soon as switch arm 52 makes contact with the contact 55 the switch arm 43 is connected to the valve motor 39 through a wire 27, switch arm 52 and wire 74. The valve motor 39 is now therefore obviously under the control of the switch arm 43 and the fixed contacts 45 and 46. As soon as the switch arm 53 makes contact with the fixed contact 57 the damper motor 13 is moved to complete closed position of the damper 3 and open position of coil valve 9. This is brought about by reason of electrical connections being made between the wire 76 and the wire 28 through the following circuit: from wire 76 through the wire 73, through the switch blade 53 and wire 28 to the damper motor 13 to which the wire 76 also connects. The effect of this last described circuit being made is the same as normal movement of the slider 41 to the extreme left end of resistance 42, it being understood of course, as previously explained, that the damper 3 is moved to closed position if the temperature falls as indicated by slider 41 being at the left end of the slider 42. When the damper 3 is moved in this manner to its closed position, the coil valve 9 remains in an open standby position during the night. Inasmuch as the fans 4 are stopped at this time there is no forced circulation of air through the unit ventilator and it follows that not nearly as much heat from coil 7 is used for heating the rooms as during the daytime when the fans 4 are operating.

The above operations having taken place, the room temperature will now begin to fall down to the range of 60° to 62° within which the direct radiator 2 is controlled by the switch arm 43. Whenever the switch arm 43 is in contact with the fixed contact 46 the valve 38 is closed and whenever the switch arm 43 is in contact with the fixed contact 45 the valve 38 is open. The direct radiator 2 is thus operated at night to maintain the room temperature at a value between 60° and 62°. This manner of operation of valve 38 is the same as that described in the Kronmiller application previously referred to, the electrical circuits being in part from the switch arm 43 through wire 27, switch blade 52 to wire 74 and to the motor 39.

At a predetermined time in the morning, the time switch 79 will again complete the circuit formed by conductors 60 and 61. At this time the motor 5 will be energized, beginning operation of the fans 4 for enforcing circulation of air to the room being heated, and the coil 51 will be energized, moving the switch arms 52 and 53 to the left. As soon as the switch arm 52 engages the fixed contact 54, the direct radiator valve 38 will be moved to open position (if it does not happen to be already open) through an electrical circuit through the right end of mercury switch 34 which has already been described. The contacts at the right end of mercury switch 34 will be made at this time inasmuch as the temperature of the room is below 69°. The slider 41 at this time will be at the extreme left end 47 of slide wire resistance 42 inasmuch as the temperature is somewhere between 60° and 62°. Heat will now be supplied to the room at a maximum rate because the radiator valve 38 is open, the coil valve 9 is open, the damper is closed and the fans 4 are circulating room air over the coil 7 for heating the room. The temperature will now rise and at a temperature of approximately 67°, for example, the damper 3 will be moved to a minimum fresh air position at which the minimum amount of fresh air necessary for ventilation is admitted and mixed with recirculated room air. At a temperature of approximately 68° the parts will again be in the position shown in the drawings and as above described, at a temperature of approximately 69°, for example, the radiator valve 38 will be shut off and the cycle of events which has already been described at temperatures above 68° will transpire.

From the above it will be obvious to those skilled in the art that I have provided a completely electrically controlled heating system which can be automatically set to maintain desired day and night temperatures from a remote point. A resetting from day to night temperatures and back again may be either accomplished automatically by the time switch 49 or if desired a manual switch 35 may be used for this purpose. In addition to this desirable control feature whereby I eliminate all apparatus except electrical control mechanism which it is well known is very reliable, I have provided an automatic heating cycle which brings up the night to the day temperature in a minimum of time without loss of heat and which automatically functions to insure that the room is provided with the proper amount of fresh air.

As has been described, the time switch 79 may be set so as to cause the system to go on a night temperature at one hour, for example, after school is out. If it is desired to occupy a room or rooms after this hour, I have provided means whereby an individual in a room may return that room to the desired daytime temperature without affecting the temperatures in other rooms. I now refer to my mechanical latch relay shown in detail in Figures 3 to 6 inclusive, and which is represented generally by the reference numeral 50 in room A. After the coil 51 has become de-energized by operation of time switch 79 I may mechanically move the relay to "in" position, that is with switch arms 52 and 53 in their left positions, by rotation of the knob 96 (see Figures 3 to 6) in the manner above described. Thus when switch arms 52 and 53 are manually moved to their "in" positions the apparatus will automatically return to the daytime temperature in substantially the same manner as I have already described above in connection with the automatic operation. However, when I manually move the switch arms of the relay 50 to their "in" position the room is returned to its proper daytime temperature but without operation of the circulating fans 4 inasmuch as they are only energized by operation of the time switch 79 as already described or by manual switches 35 located in the basement of the building and accessible to the janitor. During this particular heating operation it will be obvious that slider 41 controls the temperature by turning valve 38 alternately on and off through the switch 34, the latter switch acting now substantially in the manner of a relay between the proportioning thermostat and valve 38. The room temperature may now be returned to its night-time value at any time by manually turning the knob 96 so as to again allow the relay to assume its "out" position with the switch arms 52 and 53 in their right-hand positions as seen in Figure 1. However, if the occupants of the particular room leave it without having bothered to return the manual knob 96 so as to permit the relay to again assume its "out" position, in the morning when the relay is electrically energized through operation of the time switch 79 the knob 96 will automatically assume the position shown in Figure 4. As this particular operation of the mechanical latch relay has already been described it need not be repeated.

From the foregoing it should be clear that my system has numerous heating and control advantages, particularly by reason of the fact that I utilize only electrical apparatus which is so arranged that I can produce the desired control functions either automatically from a remote point in the basement or manually from an immediate point by reason of my improved relay device. I have thus eliminated all control apparatus as often used in this type of system except electrical devices which are recognized as being the more economical, efficient and desirable.

*Rooms B and C*

Referring now to the room designated B of Figure 1, the apparatus of this room is exactly the same as that of room A. For purposes of simplifying the drawings, however, I have not shown all the details of construction of the unit ventilator 1 in room B but it is to be understood that the unit ventilator of this room has all the apparatus identical with that disclosed in room A. It will be seen that the relay coil 51 of room B is energized whenever the relay coil 51 of room A is energized by reason of wires 60a and 61b being connected to the line conductors 60 and 61 respectively.

In room C I have modified my heating and control apparatus somewhat inasmuch as by reason of the particular modification I can accomplish similarly satisfactory heating results with less apparatus because I utilize the unit ventilator of room B for cooperation in heating room C.

It will be seen that I have provided an opening 18 in the partition wall between rooms B and C whereby the circulation of air enforced through the unit ventilator 1 of room B also circulates through the room C and provides ventilation therefor. Also in room C instead of employing the dual thermostat of rooms A and B, I use day and night thermostats of the bimetal type having hot and cold fixed contacts as disclosed. Numeral 40a indicates the day thermostat, having fixed hot and cold contacts 46a and 45a respectively, and numeral 40b represents the night thermostat which is of the same type having fixed hot and cold contacts 46 and 45 respectively. The mechanical latch relay 50 of room C is identical with that of rooms A and B and when it is in the energized, that is, the "in" position (as shown in the drawings), switch arm 52 engages the fixed contact 54 and the day thermostat 40a is in control. When the relay is in its deenergized or "out" position, switch arm 52 engages contact 55 and the night thermostat 40b is in control.

The operation of room B is the same as that of room A with the exception that the unit ventilator circulates air through room C as well as room B by reason of the opening 18 in the partition wall between the rooms. Referring to the operation of the apparatus of room C, as above described, during the daytime when the relay is "in" the day thermostat 40a controls the motor 39 of radiator valve 38 so as to maintain a temperature which may be between 70° and 72° for example. In other words, contact 46a may be engaged by arm 41a at 72° causing closure of valve 38, and arm 41a may engage contact 45a at 70° causing opening at the valve 38. The operation of each of the thermostats 40a and 40b in controlling the valve 38 is the same as the operation of switch arm 43 of room A in controlling the valve 38 of that room. The various electric wires shown in room C are numbered the same as those in room A, additional branch wires having a distinguishing letter, and therefore the electrical circuits need not be again traced inasmuch as they are similar. It will be understood of course that when the night thermostat 40b is in control, a desired night temperature of, for example, from 60° to 62° may be maintained thereby.

As has previously been pointed out, the three rooms A, B and C may form a zone of a building and may be simultaneously controlled from a remote point in the basement by the time switch 79 or manual switch 35 as already described. However, these three rooms A, B and C need not necessarily form a zone in the sense with which those in the art are familiar, but these three rooms may comprise any three particular rooms designated for use after school hours and which may therefore be grouped for purposes of control in the manner shown. It will now be seen that the temperatures of these three rooms may be reset simultaneously from the day to the night temperature by the janitor from a point in the basement. The manual switch 35 may be thrown by the janitor for purposes of making this reset. This is a very important feature of my invention inasmuch as it enables the janitor to reset the temperature of a designated group of rooms by throwing a single switch in the basement and thus eliminating the necessity of his going to each individual room and resetting a thermostat in that particular room which has been conventional in prior art devices. Inasmuch as my mechanical latch relay automatically releases itself from the latched position whenever the relay coil is deenergized, any necessity of the janitor going to individual rooms to make adjustments of the thermostats is obviated.

While describing the cycle of operation I utilize in the heating and control of my system, I have specified various exemplary temperatures at which various functions in the cycle may occur. It is to be understood that these temperatures may be varied within the scope of the invention and the exact sequence of operation of the damper and valves as respects temperature values may be varied without departing from the spirit of the invention.

Figure 2:
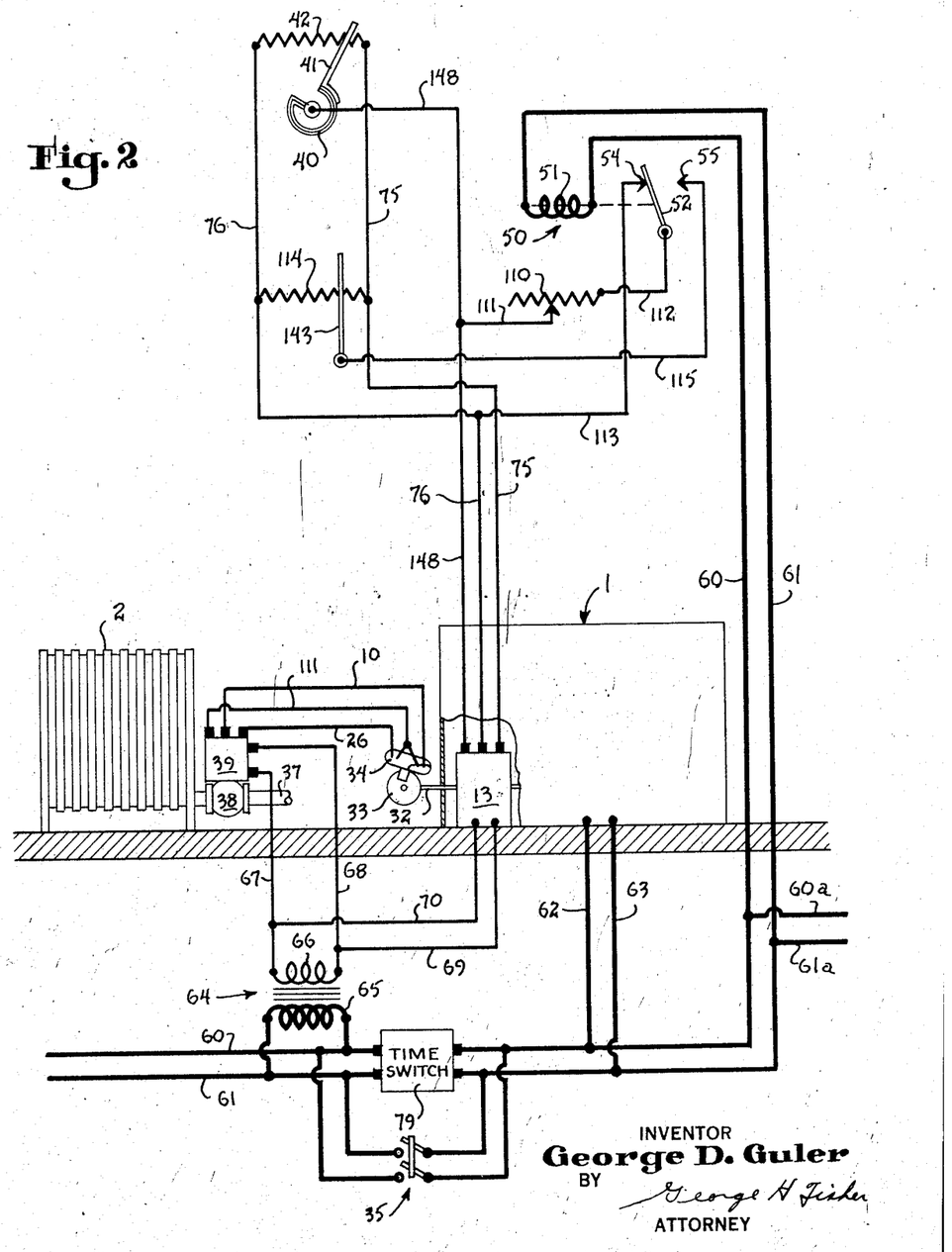
Figure 2 is a modification of my invention wherein a modified form of dual thermostat is used.

Modification of Figure 2

In Figure 2 I have disclosed a modified form of my invention in which I utilize a dual electric potentiometer type thermostat which can be reset from a daytime control point to a night-time control point from a remote position or from an immediate position by means of my mechanical latch relay. The heating apparatus of this modification is the same as that in rooms A and B of Figure 1, and the parts being similarly numbered need not be described again. It will be noted that in Figure 2 I control the direct radiator 2 solely from the mercury switch 34. The proportioning motor 13 being controlled by the dual electric thermostat, it follows that the indirect radiator, the damper and the direct radiator 2 are controlled from the potentiometer thermostat. Instead of placing the direct radiator 2 under the control of a switch corresponding to the switch 43 of Figure 1, I reset the control point of the dual electric thermostat for night operation.

The thermostat itself takes generally the form of the one disclosed in the patent to Taylor to which reference has previously been made. The ends of the slide wire 42 are connected to the proportioning motor 13 by wires 75 and 76 as in Figure 1 and the thermostatic element 40 is connected to the proportioning motor by a wire 148. As is well understood in the art with respect to this type of electric remote control, movement of the slider 41 to the right along resistance 42 operates the motor 13 in one direction, which in the present instance is heat decreasing direction, and movement of the slider 41 to the left along resistance 42 operates the motor 13 in the opposite direction, which in the present instance is heat increasing direction. I provide additional elements and electrical wiring in connection with my improved thermostatic control, whereby the slider 41 may operate substantially over the right half of resistance 42 in the daytime and may operate substantially over the left half of resistance 42 at night, the control point being shifted from the right side of resistance 42 to the left accordingly in a manner which will be now described. With the parts in the position shown on the drawings, the apparatus is operating on the daytime cycle and the slider 41 is substantially at the mid point on the right half of resistance 42, indicating that the temperature is at substantially the desired predetermined value. The coil 51 of relay 50 is energized and it will be seen that by reason of the engagement of switch arm 52 with contact 54, a variable resistance 110 is connected between wire 148 and the wire 76 in parallel with that portion of resistance 42 between slider 41 and wire 76, through the following circuit: from thermostat 40, through wire 148 and wire 111, through resistance 110 and wire 112 to switch arm 52 and a wire 113 to wire 76. The effect of thus connecting the resistance 110 as described is obviously the same as if the slider 41 were moved to the left along the slide wire resistance 42 to increase the heating effect of the apparatus controlled by motor 13. The increased heating causes the slider 41 to be moved to the right of mid position of resistance 42 and rebalancing of the potentiometer circuit takes place at a predetermined desired daytime temperature with the slider 41 substantially at the mid point of the right half of resistance 42. It will be understood that the internal wiring of motor 13 comprises a rebalancing potentiometer corresponding to that of the Taylor patent previously referred to. Additionally I employ a resistance in series with wire 148 within the casing of motor 13 which partially desensitizes the rebalancing potentiometer resistance whereby motor 13 may operate over its full range while slider 41 moves over each half of resistance 42. Obviously, by adjusting the variable resistance 110 the daytime temperature which is to be maintained may be adjusted.

It will be understood that during the daytime the cycle of operation of the heating apparatus of Figure 2 is substantially the same as that in Figure 1, the direct radiator 2 being turned on at a predetermined room temperature at which the contacts at the left end of mercury tube 34 are made. The operation of the mechanical latch relay 50 is the same as that already described in connection with Figure 1, this relay becoming deenergized by the time switch 79 at a predetermined time in the evening, causing switch arm 52 to engage the fixed contact 55. It will be understood that when switch arm 52 breaks contact with the contact 54 the above described circuit through the variable resistance 110 is interrupted. The slider 41 would now take a position substantially at the mid point of resistance 42 but inasmuch as it is now desired to operate with the slider 41 moving over the left half of resistance 42 at a substantially lower night-time temperature, provision is made for such position of the slider 41. When switch arm 52 engages contact 55 it will be seen that a resistance 114 and an adjustable slider therefor 143 are made part of the control apparatus. The resistance 114 is connected between the wires 75 and 76 in parallel with the resistance 42 and forms an additional control potentiometer, connected in parallel with the thermostatic control potentiometer as follows: from the thermostat 40 through wire 148, wire 111, resistance 110, wire 112, switch arm 52 and a wire 115 to the slider arm 143. As soon as the slider 143 is connected to the thermostat 40 through the above described circuit, it has the same effect as a movement of the slider 41 to the right along the line wire 42, that is, in a heat decreasing direction of the proportioning motor 13. It will be seen of course that the slider 143 is not in the mid position of resistance 114 and therefore causes an unbalancing of the potentiometer circuit in the direction as above described for causing a heat decreasing movement of the proportioning motor 13. Due to the decrease in heating now occasioned, the slider 41 will move to the left along the resistance 42 to substantially a mid position of the left half thereof, whereupon rebalancing of the potentiometer circuit will be brought about and an equilibrium temperature will be attained. It will be understood that in the present modification a normal daytime temperature of, for example, 71° may be maintained and a normal night-time temperature of 61°, for example, may be maintained similar to the previous modifications already described. It will be seen that in the night position of the parts that the resistance 110 is in the connection between slider 143 and the thermostat 40. The effect of this resistance at night is insubstantial as compared with resistance 114, because rather than being in parallel with any part of resistances 42 or 114 it is in series with wire 148 and slider 143. By adjustment of slider 143 along resistance 114 the control point of the instrument may be adjusted to a suitable predetermined night-time temperature thereof.

When the thermostat has been manually or automatically reset for a night temperature, the motor 13 will be operated in heat decreasing direction, that is, the damper will be moved towards its maximum open position and the coil valve of the unit ventilator will be moved towards closed position. The temperature in the room will as a result fall and thermostat 40 will move the slider 41 leftward along the slide wire resistance 42. Movement of the slider 41 to the left along resistance 42 will begin to counteract the effect of damper motor 13 moving in a heat decreasing direction and will begin to move it back in the opposite direction in a heat increasing manner as the temperature continues to fall. Inasmuch as the fan motors of the unit ventilator have been stopped at the time that the thermostat was reset to its night position, the temperature will continue to fall even though the thermostat tends to now move the damper motor in heat increasing direction. The damper motor will continue to be moved in this direction until at a predetermined temperature of, for example, 62° which will be determined by the position of slider 143, the left end of mercury switch 34 will be made. Bridging of the contacts at the left end of mercury switch 34 will energize the valve motor 39 through a circuit comprising wire 26, motor 39 and wire 111 back to the left end of the mercury switch. This circuit will operate motor 39 in a manner to open valve 38 in the same manner as previously described in connection with Figure 1. Turning on of the direct radiator 2 will now supply heat to the room and cause the temperature to rise. As soon as the temperature begins to rise, damper motor 13 will no longer be moved in heat increasing direction by thermostat 40. Now as the temperature rises sufficiently, thermostat 40 will move slider 41 to the right, causing motor 13 to operate in a heat decreasing direction which will at a predetermined temperature cause mercury switch 34 to be tilted so as to bridge the contacts at the right end thereof. Upon this happening the contacts at the left end will of course be broken and a circuit through the motor 39 will be completed as follows: from the right end of the mercury switch through a wire 111 to motor 39 and through a wire 10 back to the mercury switch. Completion of this circuit will energize motor 39 in a manner to close valve 38 and the direct radiator will be turned off. Thus the temperature of the room will be maintained at a substantially predetermined temperature, the direct radiator 2 being turned off and on so as to supply the necessary heat to maintain this temperature. It will be understood that while the direct radiator 2 is now being operated in this manner the coil valve of the unit ventilator will be open and the fresh air damper is operated in a partially open position. This is a desirable function inasmuch as it permits the circulation of some fresh air to the interior of the building during the night and prevents the atmosphere within the building from becoming undesirably stale.

From the detailed description which I have made of my improved thermostatic control and heating arrangement, the numerous advantages and desirable results to be gained by those practicing my invention should be apparent to those skilled in the art. My invention may be employed in a building having a great number of rooms and I may preferably control the electrical circuits for the unit ventilators from manual switches located on a panel board in the basement. I may either control unit ventilators from individual manual switches or I may arrange the switches so as to each control a group of ventilators. Thus in order to initiate a daytime cycle of operation in any room or group of rooms or in a particular zone as the arrangement may be, I need only to throw the manual switch controlling that particular ventilator or group of ventilators. Energization of the unit ventilator circuits also energizes the relay coils which move the relay switches to their daytime cycle position.

My particular heating cycle adapts itself to a very flexible control arrangement and provides for very efficient reset of the control from day to night temperatures and back again without delay or an undue amount of manipulation of control elements. My entire control system is predicated and based upon the use of electrical devices only which may be suitably marked so that any one either skilled or unskilled may operate them and know exactly what results to expect. In large school buildings, for example, considerable work is entailed on the part of the janitor when it is necessary to reset the control point of thermostats in individual rooms to be used at night. As I have already pointed out, in my particular arrangement the janitor may reset the control points of the thermostats in a designated room or group of rooms by throwing in the ventilator switch in the basement controlling the unit ventilator in that particular room or group of rooms.

In installations employing my invention, I contemplate the use of control panels located in the basement carrying the manual switches for control of the unit ventilators and the relays and which will provide for a very efficient and systematic form of centralized control. With this type of control wherein the janitor or an engineer may exercise control from a central point over the building as a whole or a designated group of rooms, substantial economies in fuel cost may be effected and more complete comfort for people using the building may be accomplished.

While I have disclosed and described in detail certain forms of my invention, it is expressly understood that there are many and varied changes in its form and in its various aspects which will occur to those skilled in the art but which will not depart from the spirit and scope of the invention. My disclosure is therefore to be interpreted as illustrative only and I am to be limited only as is determined by the scope of the appended claims.

I claim as my invention:

1. In a system of the class described, a plurality of devices to be controlled, a relay controlling each of said devices, said devices being controlled in one manner when said relays are energized and being controlled in a different manner when said relays are deenergized, a master switch for causing the simultaneous energization and deenergization of all of said relays at certain predetermined times, means for manually placing any of said relays in energized position and holding it in said position while said relays are deenergized, and means for removing the relays from the influence of said last named means in response to energization of said relays by said master switch so that upon subsequent deenergization of said relays by said master switch, said relays which have been previously manually moved to energized positions will return to deenergized positions.

2. In a temperature control system, a plurality of spaces whose temperatures are to be controlled, a temperature changing device in each space, a temperature responsive means in control of each device, a relay for each temperature responsive means, means whereby each temperature responsive means controls the respective temperature changing device to maintain a predetermined temperature in the respective space in response to the energization of its relay and to maintain a different predetermined temperature in response to the deenergization of its relay, means for energizing said relays at predetermined times and for deenergizing said relays at other predetermined times, means for manually moving any relay while deenergized to its energized position and holding said relay in said position until it has been energized and again deenergized.

3. In a system of the class described, a plurality of spaces to be heated, a heater for each of said spaces, a thermostat in control of each heater, a relay for each thermostat, means responsive to energization of said relays to cause the thermostats to control the heaters to maintain a high predetermined temperature in each of said spaces, means responsive to deenergization of said relays to cause the thermostats to control the heaters to maintain a low predetermined temperature in each of said spaces, means for simultaneously energizing all of said relays at certain predetermined times and for simultaneously deenergizing all of said relays at certain other predetermined times, means for manually moving any relay to its energized position and holding it in said position while said relays are deenergized, and said last means being inoperative to hold said relay in its energized position after said relays have all been energized and again deenergized.

4. In a temperature control system, in combination, means for heating a space including direct radiation means and indirect radiation means, thermostatic mechanism responsive to the temperature of said space including a modulating controller and a two-position controller, control means operable selectively to place said indirect radiation means under control of said modulating controller so as to maintain a predetermined range of temperature during a period when said space is occupied, or to place said direct radiation means under control of said two-position controller so as to maintain a lower range of temperature during a period when said space is unoccupied, and means associated with said indirect radiation means and responsive to the operation of said indirect radiation means at its maximum output for causing operation of said direct radiation means.

5. In a temperature control system, means for heating a space including direct radiation means and indirect radiation means, means for selectively controlling said direct radiation means to maintain a predetermined range of temperature and said indirect radiation means to maintain a higher predetermined range of temperature, and means operative when said higher range has been selected and the temperature is below a predetermined value for operating both said radiation means simultaneously.

6. In a temperature control system, in combination, heating means in a space to be heated, a dual electric thermostatic device controlling said heating means, said thermostatic device being capable of controlling said heating means to maintain one or another of desired temperatures, means comprising a relay switch for shifting control of said dual electric thermostatic device from one to another desired temperature, means for energizing said relay switch from a remote point, means for manually latching the switch in substantially its energized position when it is deenergized, and means responsive to energization of said relay switch for releasing said latching means.

7. In a temperature control system, in combination, heating means for heating a space, temperature responsive means for controlling said heating means to selectively maintain one of a plurality of different temperatures in said space, an electrical device movable between two positions, said device assuming one position when energized and another when deenergized, connections between said device and said temperature responsive means so that movement of said device to energized position causes the selection of one of said plurality of different temperatures, and movement of said device to deenergized position causes the selection of another of said plurality of different temperatures, means for energizing and deenergizing said device to control said selection, means for manually latching said device in energized position when deenergized, and means for releasing said latching means upon energization of said device.

8. In a temperature control system for a building having a plurality of rooms, in combination, in each room, heating means for heating the room, temperature responsive means for controlling said heating means to maintain the room temperature selectively at one of two different ranges, an electrical device movable between two positions, said device assuming one position when energized and another when deenergized, connections between said device and said temperature responsive means so that movement of said device to energized position causes the selection of one of said temperature ranges, and movement of said device to deenergized position causes the selection of the other of said temperature ranges, means for manually latching said device in energized position when deenergized, means for releasing said latching means upon energization of said device, and master control means for simultaneously energizing and deenergizing said devices in all of a plurality of rooms.

9. In a temperature control system, in combination, means for heating a space including direct radiation means and indirect radiation means, thermostatic mechanism responsive to the temperature of said space including a modulating controller and a two-position controller, control means operable selectively to place said indirect radiation means under control of said modulating controller so as to maintain a predetermined range of temperature during a period when said space is occupied, or to place said direct radiation means under control of said two-position controller so as to maintain a lower range of temperature during a period when said space is unoccupied, switch means associated with said indirect radiation means for controlling said direct radiation means, said switch means being normally ineffective, and a connection between said control means and said switch means, said control means acting through said connection to render said switch means effective when said indirect radiation means is placed under control of said modulating controller.

GEORGE D. GULER.